United States Patent
Balachandran et al.

(10) Patent No.: US 7,359,924 B2
(45) Date of Patent: Apr. 15, 2008

(54) METHODS, DEVICES, AND COMPUTER PROGRAM PRODUCTS FOR GENERATING A COMPRESSED STATUS REPORT THAT IS UPDATED TO INDICATE LATER RECEIVED DATA

(75) Inventors: Kumar Balachandran, Cary, NC (US); Jeffrey Douglas Seifert, Durham, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 657 days.

(21) Appl. No.: 10/795,568

(22) Filed: Mar. 8, 2004

(65) Prior Publication Data

US 2005/0198082 A1 Sep. 8, 2005

(51) Int. Cl.
G06F 17/30 (2006.01)
(52) U.S. Cl. ...................................... 707/203
(58) Field of Classification Search ............. 707/1, 707/2, 10, 104.1, 3, 203; 714/758; 709/224
See application file for complete search history.

(56) References Cited

U.S. PATENT DOCUMENTS

| | | | | |
|---|---|---|---|---|
| 4,455,649 | A * | 6/1984 | Esteban et al. | 370/522 |
| 5,668,641 | A | 9/1997 | Tsukamoto et al. | 358/436 |
| 5,694,391 | A | 12/1997 | Diachina et al. | 370/346 |
| 6,367,045 | B1 | 4/2002 | Khan et al. | 714/748 |
| 6,438,108 | B1 | 8/2002 | Kanljung et al. | 370/249 |
| 6,438,723 | B1 | 8/2002 | Kalliojarvi | 714/751 |
| 6,470,391 | B2 | 10/2002 | Takamoto et al. | 709/227 |
| 6,658,619 | B1 | 12/2003 | Chen | 714/748 |
| 6,873,608 | B1 * | 3/2005 | Plotnik et al. | 370/328 |
| 7,190,670 | B2 * | 3/2007 | Varsa et al. | 370/229 |
| 2002/0012337 | A1 | 1/2002 | Schmidl et al. | 370/349 |
| 2003/0202574 | A1 * | 10/2003 | Budka et al. | 375/227 |
| 2004/0243905 | A1 * | 12/2004 | Merritt | 714/758 |

FOREIGN PATENT DOCUMENTS

| | | |
|---|---|---|
| EP | 1309107 A1 | 5/2003 |
| WO | WO 00/60797 | 10/2000 |

OTHER PUBLICATIONS

Balachandran et al. "Efficient transmission of ARQ feedback for EGPRS radio link control," *Vehicular Technology Conference. IEEE VTS 50th Amsterdam*, Netherlands, pp. 1663-1669, Sep. 19, 1999.
European Standard Search Report corresponding to US79/556,804, dated Sep. 16, 2004.
International Search Report and The Written Opinion of the International Searching Authority for International Application No. PCT/EP2005/001881 mailed on Apr. 27, 2005.
Balachandran et al. "Efficient Transmission of ARQ Feedback for EGPRS Radio Link Control" *IEEE Vehicular Technology Conference*, Amsterdam 1999 pp. 19-22.

* cited by examiner

*Primary Examiner*—Etienne LeRoux
(74) *Attorney, Agent, or Firm*—Michael Cameron

(57) ABSTRACT

A first status report is generated based on initial data that has been received, such as from a mobile communications device and/or a packet network. The first status report is compressed to generate a first compressed status report. The first compressed status report is updated to generate a second compressed status report based on further data received after beginning the compressing of the first status report. The further data may be received as coded data prior to beginning the compression of the first status report but not decoded and determined to have a received status until after beginning the compression of the first status report, and/or the further data may not have been communicated until after the compression has begun and/or completed.

30 Claims, 6 Drawing Sheets

Figure 7A

| Block Seq. No. | 25 | 26 | 27 | 28 | 29 | 30 | 31 | 32 | 33 | 34 | 35 | 36 | 37 | 38 |
|---|---|---|---|---|---|---|---|---|---|---|---|---|---|---|
| Block Status | 0 | 1 | 1 | 0 | 1 | 1 | 0 | 1 | 1 | 0 | 0 | 1 | 0 | 0 |

Figure 7B

| Block Seq. No. | 25 | 26 | 27 | 28 | 29 | 30 | 31 | 32 | 33 | 34 | 35 | 36 | 37 | 38 |
|---|---|---|---|---|---|---|---|---|---|---|---|---|---|---|
| Block Status | 1 | 1 | 1 | 0 | 1 | 1 | 0 | 1 | 1 | 0 | 0 | 1 | 0 | 0 |

Figure 7C

| Block Seq. No. | 25-27 | 28 | 29-30 | 31 | 32-33 | 34-35 | 36 | 37-38 |
|---|---|---|---|---|---|---|---|---|
| Block Status | 1000 | 10 | 0111 | 10 | 0111 | 11 | 000 111 | 11 |

Figure 7D

| Block Seq. No. | 28 | 31 | 34 | 35 | 37 | 38 |
|---|---|---|---|---|---|---|
| Block Status | 0 | 0 | 0 | 0 | 0 | 0 |

Figure 7E

| Block Seq. No. | 25-27 | 28 | 29-30 | 31 | 32-33 | 34-35 | 36 | 37-38 |
|---|---|---|---|---|---|---|---|---|
| Block Status | 1000 | 000 111 | 0111 | 000 111 | 0111 | 11 | 000 111 | 0111 |

Figure 7F

| Block Seq. No. | 34 | 35 |
|---|---|---|
| Block Status | 0 | 0 |

METHODS, DEVICES, AND COMPUTER PROGRAM PRODUCTS FOR GENERATING A COMPRESSED STATUS REPORT THAT IS UPDATED TO INDICATE LATER RECEIVED DATA

BACKGROUND OF THE INVENTION

The present invention relates to data networks, and more particularly, to devices, methods and computer program products for generating a status report that affirms and/or denies receiving data blocks.

Modern wireless networks are fast incorporating packet data features similar to those found on local area networks, such as those based on Ethernet. For example, the General Packet Radio System (GPRS) was developed as a packet data network for the Global System for Mobile Communications (GSM), the predominant cellular phone standard in the world. The GSM cellular phone uses Gaussian Minimum Shift Keying (GMSK) as the modulation on the Physical Layer. The GSM specification has gone through several revisions, each adding enhancements to the network. One revision of the specification added higher data rates through the use of adaptation between 8-ary Phase Shift Keying (8PSK) and GMSK on the Physical Layer. The changes in the Physical Layer are the essence of the Enhanced Data Rates for Global Evolution (EDGE) component of the modern GSM/EDGE Network. As part of the GSM EDGE Radio Access Network, GPRS was enhanced to include the changes to the Physical Layer, in addition to changes in the Radio Link Control (RLC) and Media Access Control (MAC) sublayers to allow for performance improvements via the use of adaptive coding and incremental redundancy, a form of Type II Hybrid Automatic Repeat Request (ARQ) procedure. Enhanced GPRS is abbreviated in the specification as EGPRS.

In EGPRS, the RLC/MAC layers on either side of the network are situated at the Mobile Station (MS) and the Base Station Subsystem (BSS). The peer RLC/MAC entities communicate using Radio Blocks of one or more RLC/MAC Protocol Data Units (PDU). Each PDU is numbered using a Block Sequence Number (BSN). In acknowledged mode, the BSNs are tracked by the sending and receiving RLC/MAC entities to allow for erroneous blocks to be corrected by the sending of additional and incremental information to aid decoding. For downlink (BSS to MS) status, the BSS polls the MS to request the status of received blocks, and the MS replies with a status report within a required period of time. For uplink (MS to BSS) status, the BSS periodically sends a status report to each communicating MS.

In GPRS, the window sizes for the ARQ are small, allowing for the status report to be sent in one unnumbered block as a bitmap. In EGPRS, the window sizes vary according to the coding scheme and may be much larger than that used in GPRS. Very often, the status report may not fit into one packet as a bitmap alone. Therefore, the specification requires the use of compression of the bitmap using run-length coding. The compression method is a minor modification of the compression tables specified for ITU T.4 compression. Requests for status of received blocks and thereto in GPRS packet networks are described in the *3rd Generation Partnership Project; Technical Specification Group GSM/EDGE Radio Access Network; General Packet Radio Service (GPRS); Mobile Station (MS)—Base Station System (BSS) interface; Radio Link Control/Medium Access Control (RLC/MAC) protocol* 3GPP TS 04.60 V8.16.0, September 2002 ("the 3GPP TS 06.60 specification").

BRIEF SUMMARY OF THE INVENTION

According to various embodiments of the present invention, a data block status report is generated. A first status report is generated based on initial data that has been received. The first status report is compressed to generate a first compressed status report. The first compressed status report is updated to generate a second compressed status report based on further data that was received after beginning the compressing of the first status report. The further data may, for example, be received as coded data prior to beginning the compression of the first status report but not decoded and determined to have a received status until after beginning the compression of the first status report or, as another example, the further data may not have been communicated until after the compression has begun and/or completed.

In some further embodiments of the present invention, the further data can include a status request and data blocks. The status request can be decoded separately from the data blocks. Compression of the first status report to generate the first compressed status report can be carried out responsive to identifying the decoded status request. When the data blocks are received after compression of the first status report has begun, or after having been completed, the first status report is updated to generate a second compressed status report. The first compressed status report may be updated by determining that a data block that was received after beginning the compression of the first status report corresponds to a data block that is indicated by the first compressed status report as having not been received. A portion of the first compressed status report that indicates that the identified data block was not received can be replaced with an indication that the identified data block has been received. The status request may, for example, be received from a mobile communication device, a wireless local area network, and/or a cellular data network such a EGPRS network.

In some other further embodiments of the present invention, the first compressed status report is communicated when an elapsed time since receipt of a status request exceeds a threshold time and the second compressed status report has not been generated. The second compressed status report is communicated when the elapsed time does not exceed the threshold time and the second compressed status report has been generated. The first and second status report can be communicated, for example, from a mobile communication device to a wireless local area network and/or a cellular data network, and/or they can be communicated from a wireless local area network and/or a cellular data network to a mobile communication device.

BRIEF DESCRIPTION OF THE DRAWINGS

FIGS. 7A-F illustrate status reports, compressed status responses, and the generation of the reports and responses according to some embodiments of the present invention.

DETAILED DESCRIPTION OF THE INVENTION

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

It also will be understood that, as used herein, the term "comprising" or "comprises" is open-ended, and includes one or more stated elements, steps and/or functions without precluding one or more unstated elements, steps and/or functions.

The present invention is described below with reference to block diagrams and/or operational illustrations of methods and communication devices according to embodiments of the invention. It is understood that each block of the block diagrams and/or operational illustrations, and combinations of blocks in the block diagrams and/or operational illustrations, can be implemented by radio frequency, analog and/or digital hardware, and/or computer program instructions. These computer program instructions may be provided to a processor of a general purpose computer, special purpose computer, ASIC, and/or other programmable data processing apparatus, such that the instructions, which execute via the processor of the computer and/or other programmable data processing apparatus, create means for implementing the functions/acts specified in the block diagrams and/or operational block or blocks. In some alternate implementations, the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

Figure 1:
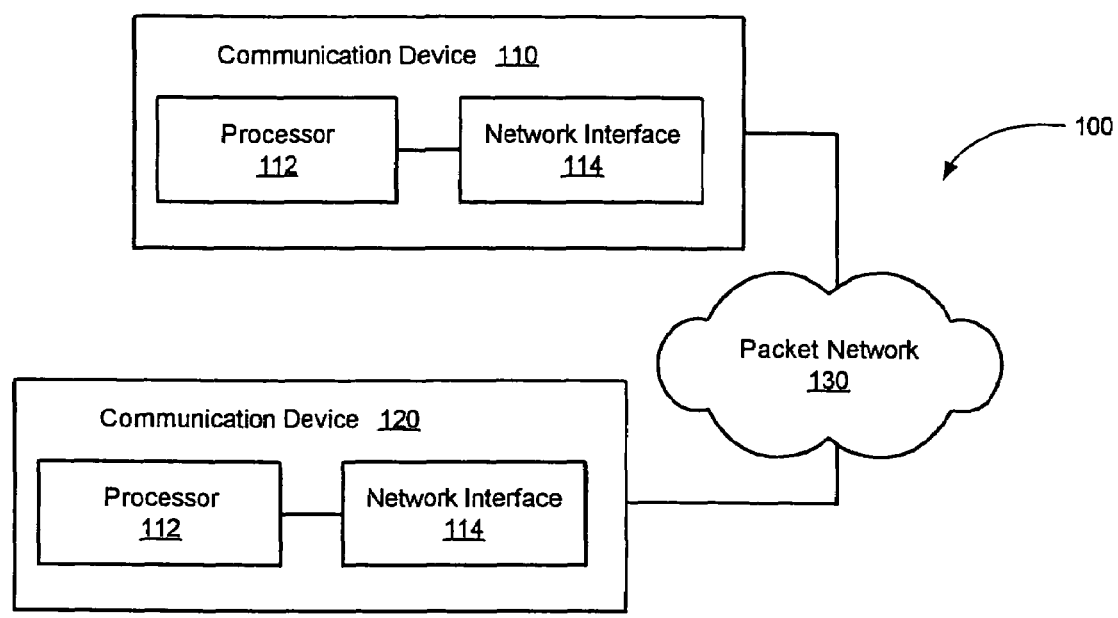
FIG. 1 is a block diagram of a data packet communication system according to various embodiments of the present invention.

FIG. 1 is a block diagram of an exemplary data packet communication system 100 according to various embodiments of the present invention. The communication system 100 includes two communication devices 110 and 120 that communicate data packets through a packet network 130. The communication devices 110 and 120 include a processor 112 and a network interface 114. In some embodiments of the present invention, the network interface 114 is configured to provide wireline communications with the packet network 130, such as through a wired local area network (e.g., Ethernet). In some other embodiments of the present invention, the packet network 130 is a wireless local area network (e.g., IEEE 802.11 and/or Bluetooth) and/or is a cellular data network such as a Cellular Digital Packet Data (CDPD), GPRS, EGPRS, and/or EDGE communication network and the interface 114 is configured to communicate with the packet network 130 over a wireless air interface. Accordingly, the communication devices 110 and 120 can be mobile communication devices.

Figure 2:
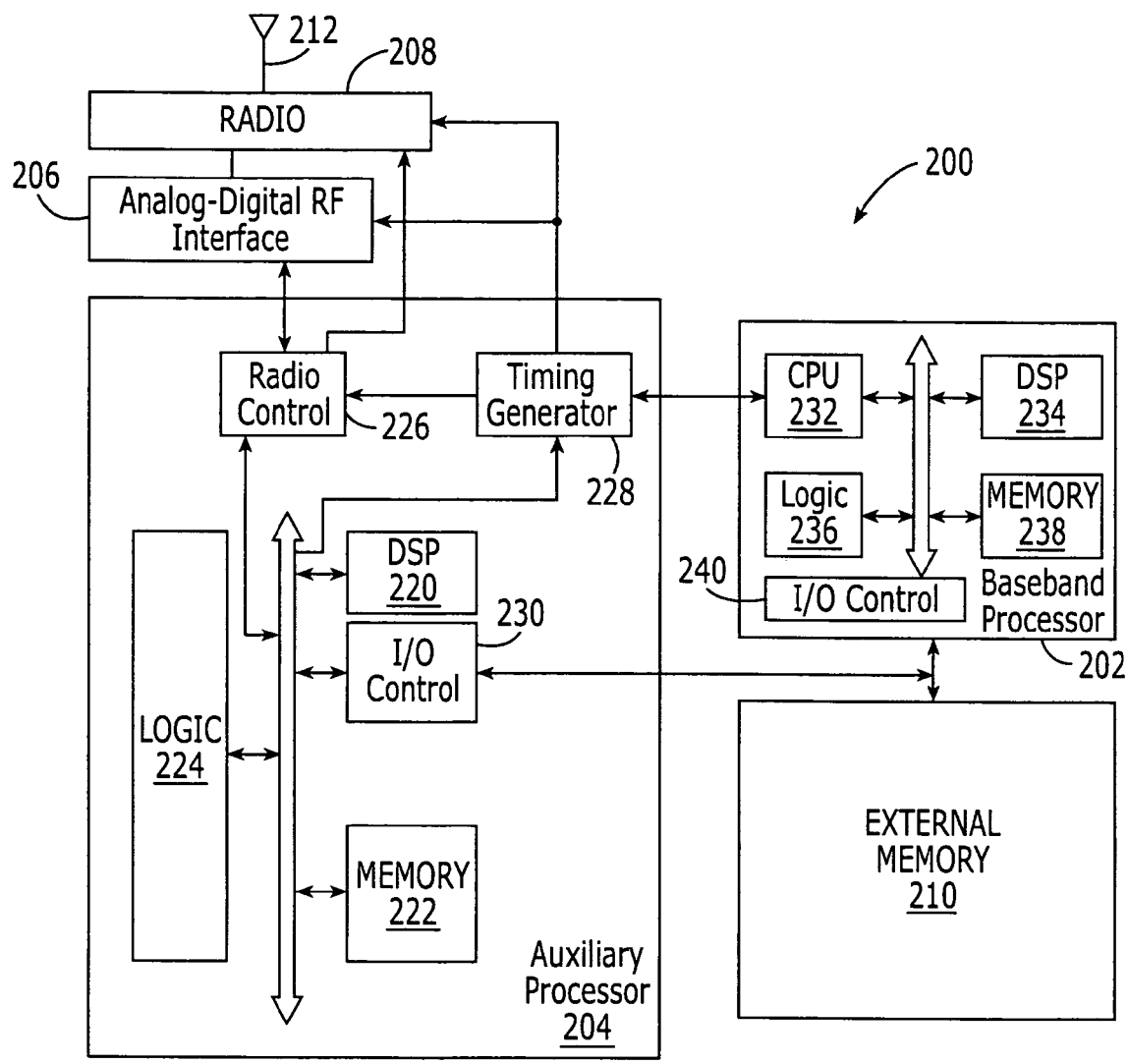
FIG. 2 is a block diagram of a wireless communication device according to some embodiments of the present invention.

FIG. 2 is a block diagram of a communication device 200 that communicates with a wireless packet network, such as a GPRS, EGPRS, EDGE, and/or CDPD cellular network using radio frequency (RF) signals, which may be communicated through an antenna 212. The communication device 200 may alternatively, or additionally, be configured to communicate via a wireless local area network interface (WLAN), Bluetooth interface, or another RF communication interface, and/or an optical interface, and/or the communication device 200 may be part of the wireless packet network, such as part of a router or base station.

The communication device 200 includes a baseband processor 202, an auxiliary processor 204, an RF interface 206, a RF radio 208, and may include a memory 210 that is external to the baseband processor 202 and the auxiliary processor 204. The RF radio 208 downcoverts/upconverts RF signals received/transmitted by the antenna 212. The RF interface performs digital-to-analog and analog-digital conversion on signals communicated between the RF radio and the auxiliary processor 204 and/or the baseband processor 202. For purposes of illustration only, the apparatus in FIG. 2 is referred to as a communication device 200. However, it is to be understood that the apparatus may comprise a network, such as a local area network and/or a cellular data network such as an EGPRS network.

The auxiliary processor 204 may include a digital signal processor (DSP) 220, a memory 222, digital logic 224, a radio control 226, a timing generator 228, and an input/output (I/O) control 230. Signal processing instructions may be executed by the DSP 220 from the memory 222 and/or by the digital logic 224 on information communicated through the RF interface 206 and the RF radio 208. The radio control 226 provides control signals to the RF radio 208. The timing generator 228 provides timing signals to the RF radio 208, the RF interface 206, the radio control 226, and the baseband processor 202. The timing generator 228 may be used to monitor an elapsed time from the receipt of a status (e.g., polling) request to determine when a status response should be communicated from the communication device 200. The I/O control can communicate information between the auxiliary processor 204, the baseband processor 202, and the external memory 210. The external memory 210 may be used to facilitate communication between the auxiliary processor 204 and the baseband processor 202 and/or it provides additional memory resources thereto. The baseband processor 202 may include a Central Processing Unit (CPU) 232, a digital signal processor 234, digital logic 236, memory 238, and an I/O control 240.

Although a separate baseband processor 202 and auxiliary processor 204 are shown in FIG. 2 for illustration purposes, according to various other embodiments of the present invention, the baseband processor 202 and the auxiliary processor 204 are combined into a single processor that may include one or more DSP, general processors, and/or digital logic.

Figure 3:
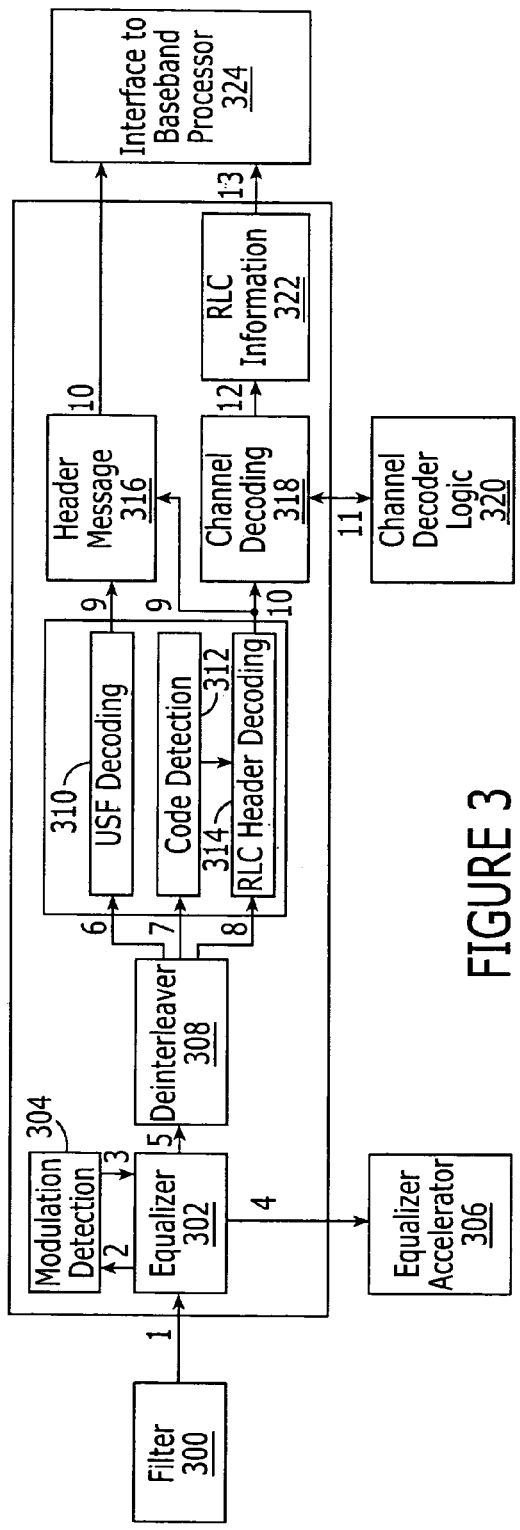
FIG. 3 is a block diagram of an auxiliary processor according to some embodiments of the present invention.

The auxiliary processor 204 may perform some signal processing operations that would otherwise be performed by the baseband processor 202, such as processing intensive operations that can be needed for EDGE communications. For example, the auxiliary processor 204 may perform signal processing operations relating to a communication physical layer, such as equalization, deinterleaving/interleaving and channel decoding/coding of communication signals. FIG. 3 is a functional diagram of operations that may be performed by the auxiliary processor 204 on a physical layer of the wireless communications. The unidirectional arrows may indicate a primary direction of communications between blocks, however it is to be understood that bidirection communications may be performed therebetween. Received data packet signals are filtered at Block 300 and are then equalized at Block 302, which may include using an accelerator at Block 306. Modulation detection is performed on the equalized signals at Block 304. Equalized signals are then deinterleaved at Block 308 to provide the data packets.

For EDGE communications, data packets include a header and data blocks. The header is coded separately from the data packets. In various embodiments of the present invention, the header is decoded and communicated to the baseband processor 202 before decoding of the data blocks is completed. For example, the header can be decoded concurrently with operations to decode an Uplink State Flag (USF) portion of the header at Block 310, to perform code detection at Block 312, and to decode a Radio Link Control (RLC) portion of the header at Block 314. Decoding of the header may be prioritized over decoding of the data blocks so that the baseband processor may have sufficient time to identify a status request and to construct a compressed status response (e.g., an EGPRS Packet Downlink ACK/NACK Message) before the deadline for responding to the status request. The decoded header is then communicated at Block 316 to the baseband processor 202 (FIG. 2) through interface operations at Block 324. The data blocks are channel decoded at Block 318, which may use channel decoder logic at Block 320, and the decoded data blocks/RLC information is communicated at Block 322 to the baseband processor 202 through the interface operations at Block 324. Channel decoding of the data blocks can take longer than decoding of the header because of, for example, consecutive decoding operations that are performed at Block 318 on data from consecutive time slots in order to reconstruct data that spans more than one time slot.

Figure 4:
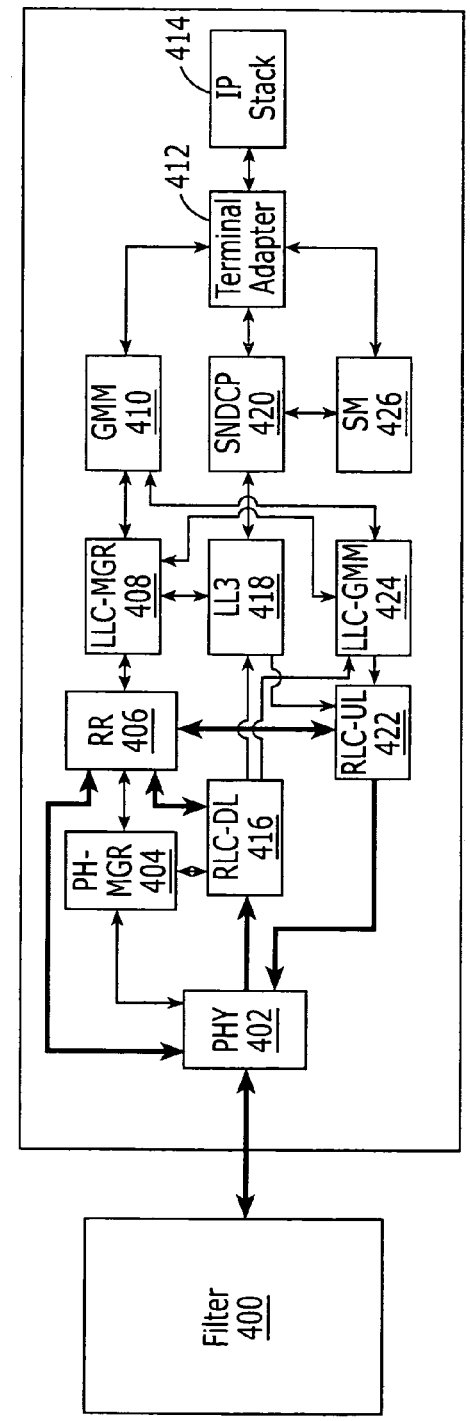
FIG. 4 is a block diagram of a baseband processor according to some embodiments of the present invention.

FIG. 4 is a functional diagram of operations that may be performed by the baseband processor 202 to manage a protocol stack for the wireless communications. The unidirectional arrows may indicate a primary direction of communications between blocks, however it is to be understood that bidirection communications may be performed therebetween. An interface to the auxiliary processor 204 is provided at Block 400. Physical (PHY) layer processing is performed at Block 402, and Physical Layer Management (PH-MGR) processing is performed at Block 404. Radio Resource (RR) management processing is performed at Block 406, and Link Layer Control (LLC) management processing is performed at Block 408. GPRS Mobility Management (GMM) processing is performed at Block 410, terminal management is performed at Block 412, and an Internet Protocol (IP) stack is managed at Block 414. Radio Link Control (RLC) Downlink (RLC-DL) processing is performed at Block 416, and LLC data Service Access Point Identifier (SAPI) (address 3) (LL3) processing is performed at Block 418. The LL3 block may be a link layer processing providing LL-SAPI processing. Subnetwork Dependent Convergence Protocol processing is performed at Block 420 and Session Management (SM) processing is performed at Block 426. RLC Uplink (RLC-UL) processing is performed at Block 422, and LLC GMM processing is performed at Block 424. The LLC GMM processing may provide GMM SAPI at a link layer.

In some embodiments of the invention, each functional block in FIG. 3 and/or FIG. 4 may form separate processing threads managed by an operating system, and/or one or more of the functional blocks may form one processing thread. Moreover, in some embodiments of the present invention, one or more of the functional blocks may be performed by hardware alone or in combination with software.

Figure 5:
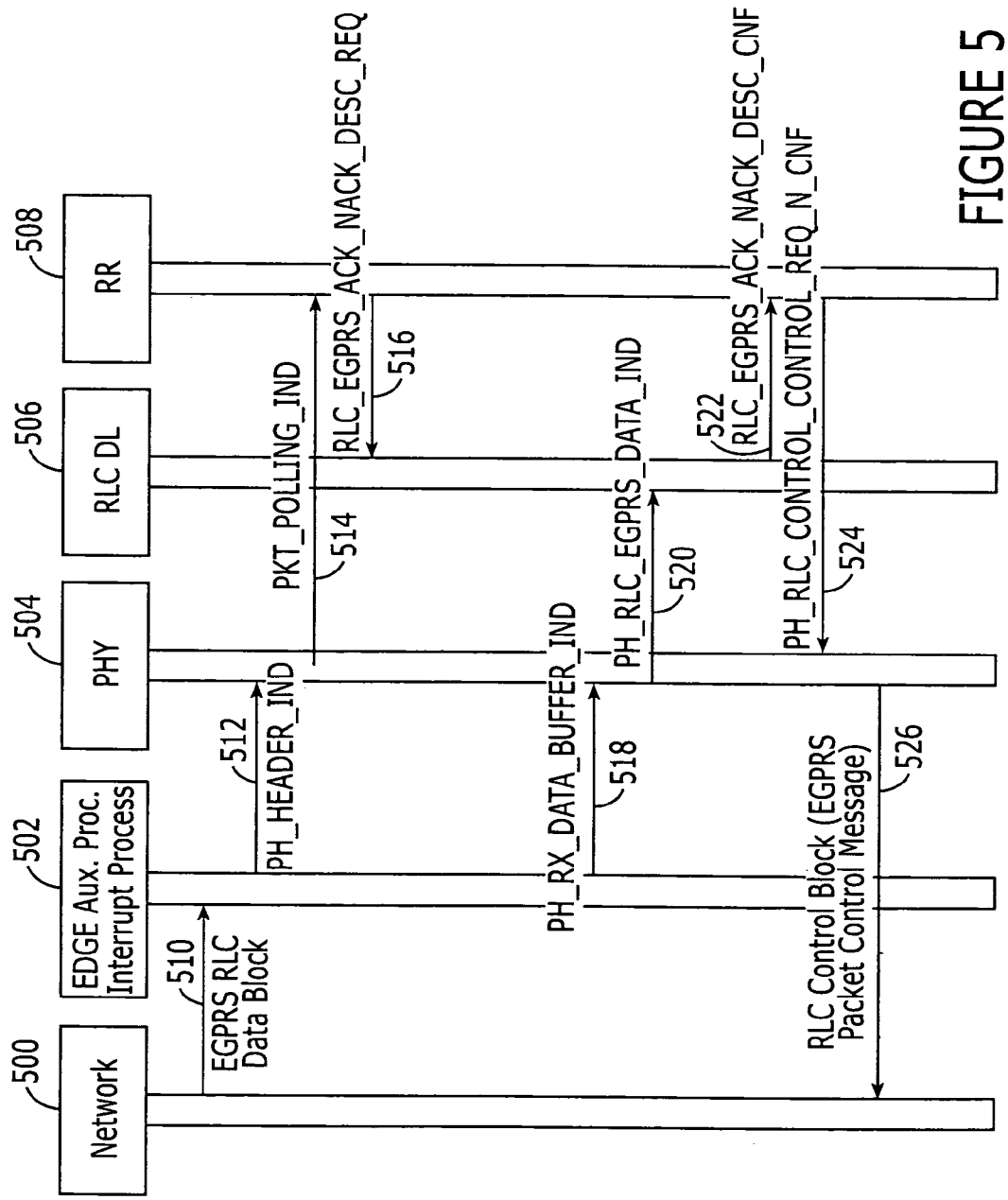
FIG. 5 illustrates exemplary operations, and their associated timing, that may be performed to respond to a status request according to some embodiments of the present invention.

FIG. 5 illustrates exemplary operations, and their associated timing, that may be performed to respond to a status request from a data packet network according to some embodiments of the present invention. For purposes of illustration only, the exemplary operations are described with regard to a EGPRS status request, however is to be understood that they are not limited to EGPRS, as they may be used to respond to a status request from and/or to other data packet networks. The operations may be performed by, for example, the baseband processor 202 to receive a status request from a data packet network 500 and to transmit a compressed status response thereto. The operations are grouped into an interrupt process 502, a physical (PHY) layer process 504, a Radio Link Control Downlink (RLC DL) process 506, and a Radio Resource (RR) process 508.

The interrupt process 502 receives a data packet 510 from the data packet network 500 that includes a header portion and one or more data blocks. The interrupt process 502 decodes the header portion of the data packet 510 to generate a header message 512 that is communicated to the physical layer process 504 by an interrupt. The PHY process 504 identifies a status request in the header message 512 and communicates the status request 514 to the RR process 508 by an interrupt. The RR process 508 generates a message 516 to the RLC DL process 506 that identifies the polled data blocks and the missing data packets in the polled sequence.

The RLC DL process 506 may maintain a status report (e.g., status bit map) of what data blocks have been, and have not been, received. Data blocks may not have a status of being received because, for example, they have not yet been communicated by the network 500 to the communication device, they were at least partially lost during communication, and/or they arrived containing errors that although they were identified, such as during decoding, they could not be sufficiently corrected by the communication device.

The RLC DL process 506 compresses the status report to generate an initial compressed status report. After beginning the generation of the initial compressed status report, the PHY process 504 may complete decoding of one or more data blocks in the data packet 510, and then provide the decoded data blocks as received data block and/or may provide their status (e.g., received/not received) as a message 518 to the PHY process 504. The PHY process 504 passes the decoded data blocks as a message 518 to the RLC DL process 506. The RLC DL process 506 updates the initial compressed status report based on the decoded data blocks to generate an updated compressed status report 522 that is communicated to the RR process 508. The RR process 508 generates a response 524 to the status inquiry based on the updated compressed status report 522 that acknowledges receipt (ACK) and/or non-receipt (NACK) of polled data blocks. The RR process 508 communicates the response 524 to the PHY process 504 for encoding and subsequent transmission to the network 500 in a RLC control block 526.

The operations that are illustrated in FIG. 5 correspond to the situation when the updated compressed status report is generated before a timing deadline for responding to the status request has occurred. If the timing deadline for a response were to occur before the updated compressed status report were completed, the initial compressed status report would be communicated as the response 524 from the RR process 508 to the PHY process 504, and would be subsequently transmitted to the network 500 in a RLC control block 526.

Figure 6:
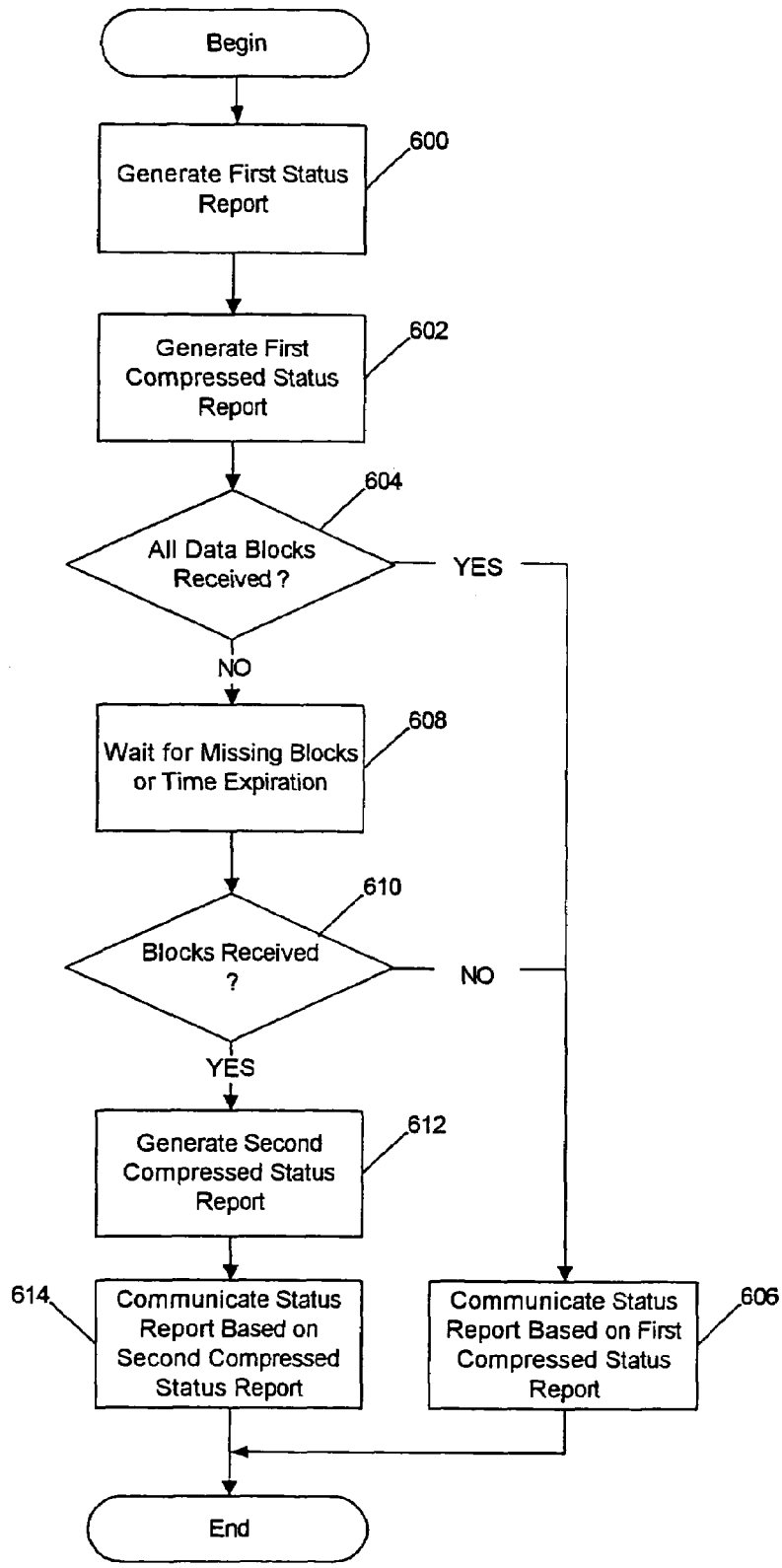
FIG. 6 is a flowchart of operations that may be performed to respond to a status request according to some embodiments of the present invention.

FIG. 6 is a flowchart of operations that may be performed to respond to a status request according to some embodiments of the present invention. At Block 600 a first status report is generated based on initial data blocks that have been received from a packet network. At Block 602 the first status report is compressed to generate a first compressed status report. The data blocks may be received from the packet network as part of a data packet that includes a status request. Compression of the first status report to generate the first compressed status report may be carried out responsive to identifying a status request in a data packet.

At Block 604 a determination is made as to whether the polled data blocks have been received. If they have been received, then at Block 606 a report that is based on the first compressed status report is communicated to the data network. If data blocks are missing, then at Block 608, the missing data blocks are waited-for until they are received and/or until a threshold time has elapsed since the status request was received. At Block 610 a determination is made as to whether any of the missing data blocks have been received and, if not, the first compressed status report is communicated to the data network at Block 606. If one or more missing data blocks have been received, as determined at Block 610, the first compressed status report is updated to generate a second compressed status report based on further data blocks that were received after beginning, or completion of, the compression of the first status report. The further data blocks may, for example, be received as coded data blocks within a data packet prior to beginning the compression of the first status report but not decoded and determined to be have a received status until after beginning the compression of the first status report, or, as another example, the further data blocks may not have been communicated by the data network until after the compression has begun and/or completed. At Block 614, a report that is based on the second compressed status report is communicated to the data network.

FIGS. 7A-F illustrate exemplary status reports and their generation according to some embodiments of the present invention. It will be appreciated, however, that these exemplary reports are for illustrative purposes only, and are not intended to limit the invention in any way. For example, although the reports are generated based on 14 data blocks (i.e., data Block Sequence Numbers (BSN) 25-38), more or less data blocks may be polled, such as by some EGPRS networks that poll the status of 1024 data blocks. The compression codes are based on those defined by the *ITU-T Recommendation T.4, Standardization of group* 3 *facsimile apparatus for document transmission*, October 1997, are provided in Appendix A of the 3GPP TS 06.60 specification, and are used as explained below.

FIG. 7A illustrates as exemplary initial status report for data Block Sequence Numbers (BSN) 25-38. The status of the data blocks is indicated by a "1" and "0", with "1" indicating that a data block has been received and a "0" indicating that a data block has not be received (e.g., not yet communicated from a packet network and/or containing uncorrectable errors). Accordingly, as illustrated in FIG. 7A, data blocks 25, 28, 31, 34-35 and 37-38 have not been received, and data blocks 26-27, 29-30, 32-33, and 36 have been received. In FIG. 7B, the status report has been updated to indicate that a data block 25 has now been received.

A data packet is then received that contains a coded status request and coded data blocks 28, 31, and 38. The status request is decoded and identified as a status request, and the status report that is shown in FIG. 7B is compressed using the codes or symbols that are based on the ITU-T T.4 compression codes to generate an initial compressed status report that is shown in FIG. 7C. It is noted that the initial compressed status report shown in FIG. 7C is longer than FIG. 7B due to the relatively short length of the status report in FIG. 7B and the compression codes or symbols that have been used. As will be appreciated by one who is skilled in the art, the compressed status report will generally be shorter than the uncompressed status report when the uncompressed status report is sufficiently long. Although coded data blocks 28, 31, 37, and 38 are contained in the received data packet, they have not yet been decoded and determined to have been received. Compression of the status table shown in FIG. 7B is carried out without waiting to determine which, if any, blocks are contained in the received data packet.

As shown in FIG. 7C, the sequences of "1"s and "0"s are separately compressed using the code tables that are based on ITU-T T.4 compression. The sequence of "1" status bits of data blocks 25-27 are represented as a bit sequence 1000. The "0" status bit of data block 28 is represented as a bit sequence 10. The sequence of "1" status bits of data blocks 29-30 are represented as a bit sequence 0111. The "0" status bit of data block 31 is represented as a bit sequence 10. The sequence of "1" status bits of data blocks 32-33 are represented as a bit sequence 0111. The sequence of "0" status bits of data blocks 34-35 are represented as a bit sequence 11. The "1" status bit of data block 36 is represented as a bit sequence 000111. The sequence of "0" status bits of data blocks 37-38 are represented as a bit sequence 11.

FIG. 7D illustrates a table of data blocks that are indicated by the initial compressed status report of FIG. 7C as having not been received. After the compression of the status table of FIG. 7B has begun, decoding of data blocks 28, 31, 37 and 38 is completed and these blocks are determined to have been received, leaving only data blocks 34 and 35 as not received. The initial compressed status report of FIG. 7C is updated by replacing coded bit sequences that indicate that the data blocks 28, 31, 37 and 38 are not received with coded bit sequences that indicate that they have been received. The resulting updated compressed status report is shown in FIG. 7E.

FIG. 7F illustrates a table of data blocks that are indicated by the updated compressed status report of FIG. 7E as having not been received. If either of the missing data blocks 34 and 35 is received before a deadline time for responding to the status request, the updated compressed status report shown in FIG. 7E is updated to reflect their receipt, otherwise before the deadline for responding, a status response that is based on the updated compressed status report is communicated to the packet network.

In the drawings and specification, there have been disclosed embodiments of the invention and, although specific terms are employed, they are used in a generic and descriptive sense only and not for purposes of limitation, the scope of the invention being set forth in the following claims.

The invention claimed is:

1. A method of generating a data status report, the method comprising:

generating a first status report based on initial data that has been received from a packet network as part of a data packet that includes a status request;

compressing the first status report to generate a first compressed status report responsive to identifying a status request in the data packet; and updating the first compressed status report to generate a second compressed status report based on further data received after beginning the compression of the first status report.

2. The method of claim 1, further comprising:
carrying out the updating of the first compressed status report to generate the second compressed status report at a communication device; and
communicating the second compressed status report from the communication device to a network.

3. The method of claim 1, further comprising:
carrying out the updating of the first compressed status report to generate the second compressed status report at a network; and
communicating the second compressed status report from the network to a communication device.

4. The method of claim 1, further comprising carrying out the updating of the first compressed status report to generate a second compressed status report at a wireless local area network and/or a cellular data network.

5. The method of claim 1, further comprising communicating the second compressed status report from a communication device to a wireless local area network and/or a cellular data network.

6. The method of claim 1, further comprising carrying out the updating of the first compressed status report to generate a second compressed status report at an Enhanced General Packet Radio Service Network.

7. The method of claim 1, further comprising identifying a received status request, and wherein the compressing the first status report is carried out responsive to the identification of the received status request.

8. The method of claim 7, further comprising:
determining an elapsed time from receipt of the status request; and
communicating the first compressed status report when the elapsed time exceeds a threshold time and the second compressed status report has not been generated.

9. The method of claim 8, further comprising:
communicating the second compressed status report when the elapsed time does not exceed the threshold time and the second compressed status report has been generated.

10. The method of claim 1, wherein the first compressed status report indicates what data has been received and what data has not been received.

11. The method of claim 10, wherein updating the first compressed status report comprises:
determining that the further data received after beginning the compressing of the first status report corresponds to data that is indicated by the first compressed status report as not received; and
replacing a portion of the first compressed status report that indicates that data is not received with an indication that it is received.

12. The method of claim 10, wherein updating the first compressed status report comprises replacing a symbol in the first compressed status report that indicates that data has not been received with a different symbol that indicates that it has been received.

13. The method of claim 1, wherein updating the first compressed status report comprises modifying the first compressed status report so that the further data received after beginning the compression of the first status report is indicated as received.

14. The method of claim 1, wherein the further data comprises a header and data blocks, and further comprising:
decoding the header;
identifying a status request in the decoded header;
compressing the first status report to generate the first compressed status report responsive to the identification of the status request;
decoding the data blocks to generate a received status for the data blocks; and
updating the first compressed status report to generate the second compressed status report responsive to the received status for the data blocks.

15. The method of claim 14, wherein the decoding the header is carried out concurrently with the decoding the data blocks.

16. The method of claim 1, wherein:
generating a first status report comprises
generating a first status indication for data that has been received,
generating a second status indication for data that has not been received, and
forming a sequential listing of the first and second status indications corresponding to a sequence of data; and
compressing the first status report comprises representing a sequence of the first status indications in the sequential listing of the first and second status indications differently than one of the second status indications and/or a sequence of the second status indications in the sequential listing of the first and second status indications.

17. The method of claim 16, wherein updating the first compressed status report comprises:
replacing a represented one of the second status indications and/or a sequence of the second status indications in the sequential listing of first and second status indications in the compressed first status report with a representation of at least one of the first status indications.

18. A communications device comprising:
an interface that is configured to receive data; and
a processor that is configured to generate a first status report based on initial data that has been received, and that is configured to compress the first status report to generate a first compressed status report, and that is configured to update the first compressed status report to generate a second compressed status report based on further data received after beginning the generation of the first compressed status report.

19. The communication device of claim 18, wherein the further data includes a status request that requests the status of data communicated to the communications device, and wherein the processor is configured to carry out the generation of the first compressed status report responsive to the status request.

20. The communications device of claim 19, wherein the processor is configured to communicate the first compressed status report when a threshold time has elapsed since receiving the status request and the second compressed status report has not been generated.

21. The communications device of claim 18, wherein the first compressed status report indicates what data has been received and what data has not been received.

22. The communications device of claim 21, wherein the processor is configured to determine that the further data received after beginning the generation of the first compressed status report corresponds to data that is indicated by the first status report as not received, and is configured to replace a portion of the first compressed status report that indicates that the indicated data has not been received with an indication that it has been received.

23. The communications device of claim 21, wherein the processor is configured to replace a symbol in the first compressed status report that indicates that data has not been received with a different symbol that indicates that the identified data has been received.

24. The communications device of claim 18, wherein the processor is configured to modify the first compressed status report so that data that is indicated as not received is then indicated as received.

25. The communications device of claim 18, wherein the further data includes data blocks and a header, and wherein the processor is configured to decode the header, and is configured to identify a status request from the decoded header, and is configured to carry out the generation of the first compressed status report responsive to the identified status request, and is configured to decode the data blocks to generate a received status for the data blocks, and is configured to carry out the updating of the first compressed status report responsive to the received status for the data blocks.

26. The communications device of claim 25, wherein the processor is configured to carry out the decoding of the header concurrently with the decoding of the data blocks.

27. The communications device of claim 18, wherein the processor is configured to compress the first status report based on ITU-T T.4 data compression.

28. The communications device of claim 18, wherein the communications device is configured to receive data from an Enhanced General Packet Radio Service (EGPRS) network, and is configured to communicate a status report that is based on the second compressed status report to the EGPRS network.

29. The communications device of claim 18, wherein the communications device comprises at least one of a wireless local area network and/or a cellular data network.

30. A computer program product for generating a data status report, the computer program product comprising program code embodied in a computer-readable storage medium, the computer program code comprising:
   program code that is configured to generate a first status report based on initial data that has been received;
   program code that is configured to compress the first status report to generate a first compressed status report; and
   program code that is configured to update the first compressed status report to generate a second compressed status report based on further data received after beginning the compressing of the first status report.

* * * * *